W. P. Lathrop,

Boring Tool.

No. 108,367.  Patented Oct. 18, 1870.

Witnesses:

Inventor.
Wm. P. Lathrop by
H. W. Beadle atty

W. P. Lathrop,
Boring Tool.

No. 108,367.   Patented Oct. 18, 1870.

Witnesses:   Inventor

United States Patent Office.

WILLIAM P. LATHROP, OF WEST WINSTED, CONNECTICUT.

Letters Patent No. 108,367, dated October 18, 1870.

IMPROVEMENT IN BORING TOOLS.

The Schedule referred to in these Letters Patent and making part of the same

*To all whom it may concern:*

Be it known that I, WILLIAM P. LATHROP, of West Winsted, in the county of Litchfield and State of Connecticut, have invented a new and useful Improvement in Boring Tools; and I do hereby declare that the following is a full and exact description of the same, reference being had to the accompanying drawing and to the letters of reference marked thereon.

This invention consists in certain details of construction, which will be fully described hereinafter.

In the drawing—

To enable others skilled in the art to which my invention appertains to make and use the same, I will now proceed to describe fully its construction and operation.

This machine is especially designed for cutting the sockets for the tang in the handle of a case-knife.

A represents the bed-plate of the machine, which supports the operating devices.

B represents the main driving-wheel, which rests in suitable bearings, and receives power in any proper manner.

C represents a crank-shaft, furnished with a pulley, c, over which passes the driving-belt from wheel B.

Figure 1:
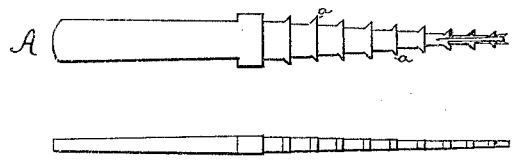
Figure 1 represents a perspective view of my mortising tool, with the machinery for operating it.
Figure 2:
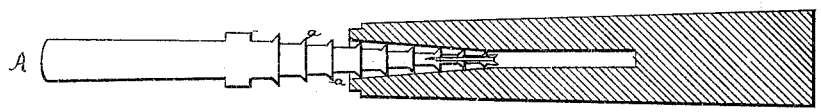
Figure 2 represents a handle which has been cut by it.

Connected to the crank-shaft is the pitman D, which has connected to it the socket d, moving in bearings d', as is shown in fig. 1.

Figure 3:
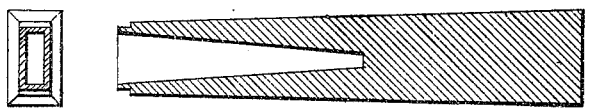
Figure 3 represents the tool itself detached.
Figures 1, 2, 3:
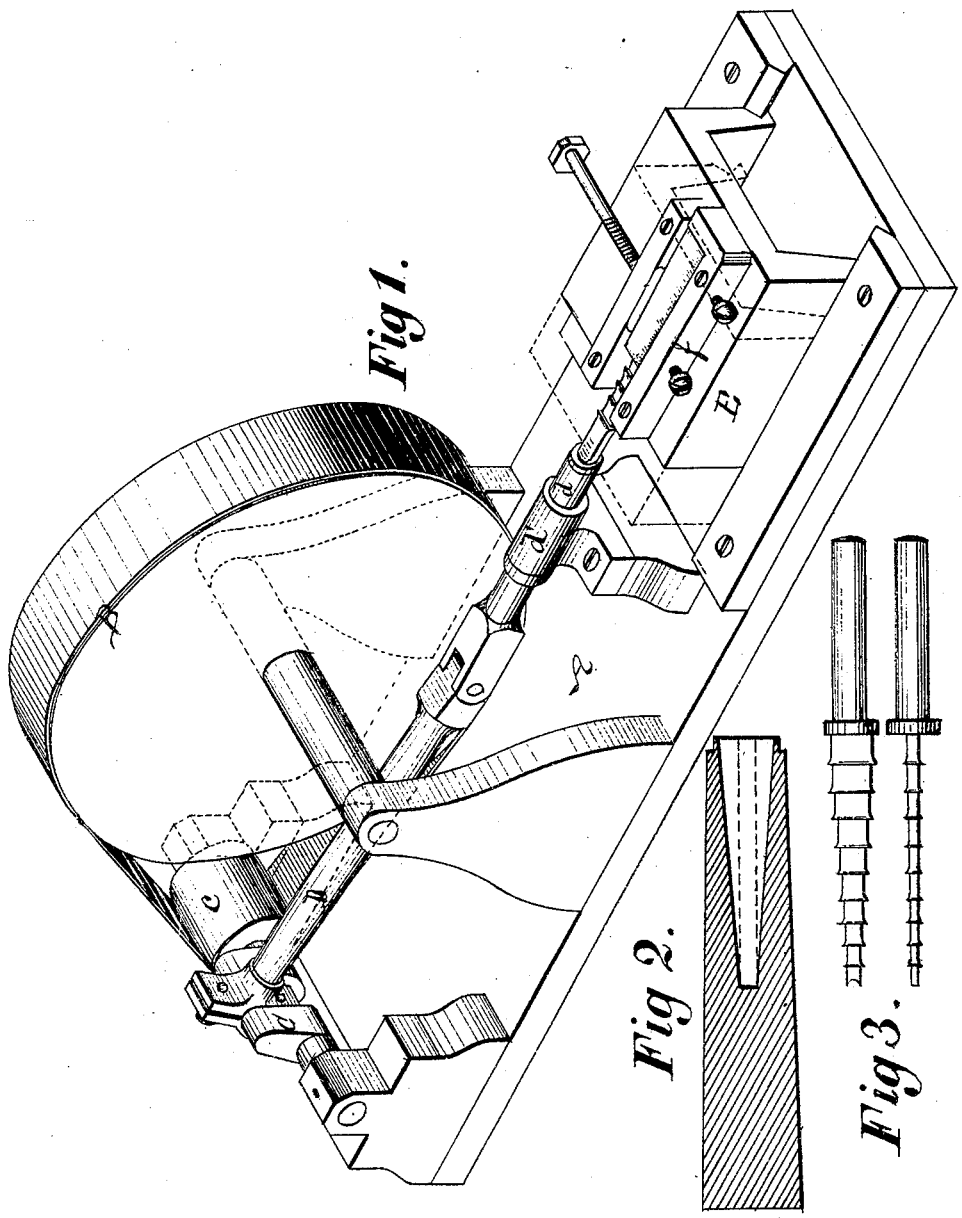

Within the socket is placed the shank of the cutting tool, which is peculiarly formed with a series of regularly enlarged cutting-points, as is shown in fig. 3.

E represents a carriage moving in suitable ways, which is provided with flanges or bars for the reception of the knife-handle which is to be cut.

One of these bars, *f*, is provided with set-screws, and the other with a screw-block, by means of which the handle is easily adjusted, and securely held in any desired position.

The operation is as follows:

The knife-handle to be cut is placed on the carriage and properly secured in place. The machine is now set in motion, and the tool, reciprocating rapidly, cuts a socket in the handle, the carriage being advanced as the work progresses.

By means of this construction a socket of the desired form and depth is obtained without weakening the wood, as is the case when the socket is burned out.

Having thus fully described my invention,

What I claim, and desire to secure by Letters Patent of the United States, is—

The reciprocating device described, consisting essentially of the pitman D and tool E, in combination with the carriage F, as described.

This specification signed and witnessed this 28th day of April, 1870.

W. P. LATHROP.

Witnesses:
E. S. WOODFORD,
WALLACE PERSONS.